Jan. 17, 1928.
H. ROSENTHAL
1,656,680
OPTICAL SIGNAL
Filed Nov. 26, 1926
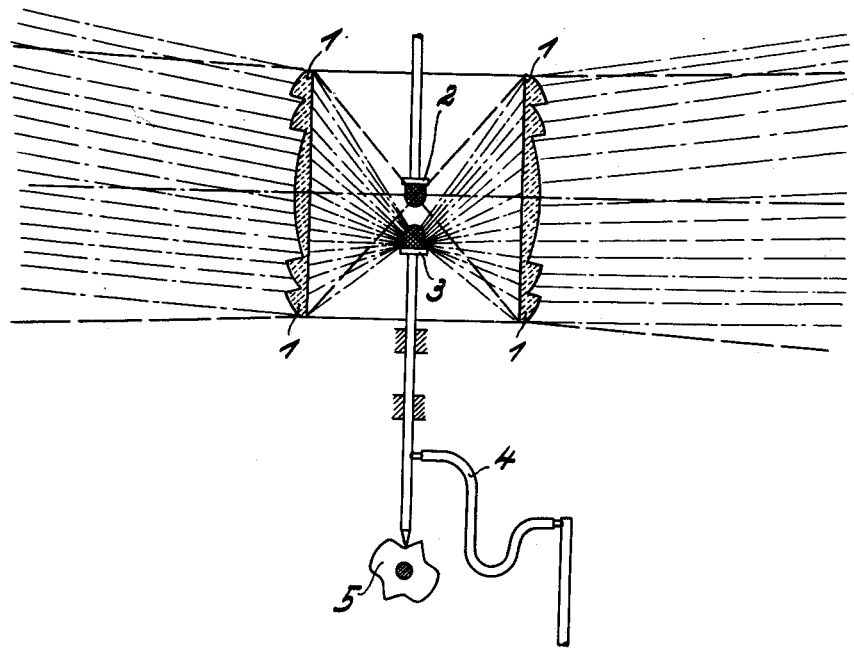
Hans Rosenthal
INVENTOR
By: Marks & Clerk
ATTYs.

Patented Jan. 17, 1928.

1,656,680

UNITED STATES PATENT OFFICE.

HANS ROSENTHAL, OF BERLIN-WILMERSDORF, GERMANY.

OPTICAL SIGNAL.

Application filed November 26, 1926, Serial No. 150,966, and in Germany December 9, 1925.

This invention relates to optical signals, and more particularly to an optical signal which is primarily intended for aerial navigation.

Signals have already been proposed, in which for the purpose of radiating the light in an inclined upward or downward direction the source of light is moved periodically out of the focal point of the lens.

Now in many cases it may be found desirable, in order to avoid the necessity of erecting special signals, to simultaneously utilize for the purpose of aerial navigation the signaling lights which have hitherto been used solely as a guide to shipping.

This, according to the invention, is accomplished by the fact that, for example, in the case of a signal in which a fixed source of light is suspended in the focal point of the optic a second source of light is provided below the first one, which second source of light may be moved in an upward and downward direction, so that in addition to the horizontal beam rays of light will be emitted in an inclined upward or downward direction which indicates the route to an approaching pilot.

A form of embodiment of the invention is illustrated by way of example in the accompanying drawing, in which 1 is a Fresnel lens, with a fixed source of light 2 arranged in the focal point thereof, whilst 3 is the second source of light which is capable of reciprocatory movement along the axis of the cylinder. 4 shows the means for supplying the gas to 3, and 5 is the operating mechanism to obtain the reciprocatory motion.

By means of the arrangement described, it is possible with one single optic to obtain horizontal and also inclined upward or downward radiation of light, so that the signal may be utilized both for aerial as well as marine navigation.

What I claim as new and desire to secure by Letters Patent is:

An optical signal comprising a Fresnel lens with a fixed source of light arranged in the focal point thereof, a source of light arranged additionally to the first one, and means for moving the said second source of light in an upward and downward direction along the cylinder axis.

In testimony whereof I have affixed my signature.

HANS ROSENTHAL.